US008411829B2

(12) United States Patent
Logan et al.

(10) Patent No.: US 8,411,829 B2
(45) Date of Patent: Apr. 2, 2013

(54) SYSTEM, METHOD AND DEVICE FOR MANAGING MESSAGES

(76) Inventors: James D. Logan, Candia, NH (US); Michael Form, Southborough, MA (US); Charles Call, Chicago, IL (US); Jeffrey Logan, Windham, NH (US); Daniel Opalacz, Glastonbury, CT (US)

( * ) Notice: Subject to any disclaimer, the term of this patent is extended or adjusted under 35 U.S.C. 154(b) by 340 days.

(21) Appl. No.: 12/639,993

(22) Filed: Dec. 16, 2009

(65) Prior Publication Data

US 2010/0183128 A1    Jul. 22, 2010

Related U.S. Application Data

(60) Provisional application No. 61/201,740, filed on Dec. 16, 2008.

(51) Int. Cl.
*H04M 1/64* (2006.01)
*H04M 11/00* (2006.01)

(52) U.S. Cl. .................... 379/88.22; 379/88.13

(58) Field of Classification Search .... 379/88.13–88.23, 379/142.17, 67.1; 370/230.1; 455/413
See application file for complete search history.

(56) References Cited

U.S. PATENT DOCUMENTS

| | | | |
|---|---|---|---|
| 4,745,564 A | 5/1988 | Tennes et al. | |
| 5,974,123 A * | 10/1999 | Nakayama et al. | 379/100.16 |
| 6,085,231 A * | 7/2000 | Agraharam et al. | 709/206 |
| 6,198,383 B1 | 3/2001 | Sekura et al. | |
| 6,341,160 B2 * | 1/2002 | Tverskoy et al. | 379/88.13 |
| 6,604,650 B2 | 8/2003 | Sagar | |
| 6,697,458 B1 * | 2/2004 | Kunjibettu | 379/88.17 |
| 6,819,247 B2 | 11/2004 | Birnbach et al. | |
| 6,829,331 B2 * | 12/2004 | Cullis | 379/67.1 |
| 7,164,755 B1 * | 1/2007 | Yokoyama | 379/88.07 |
| 7,269,476 B2 | 9/2007 | Ratnakar | |
| 7,379,421 B1 * | 5/2008 | Gao et al. | 370/230.1 |
| 7,408,843 B2 | 8/2008 | Brandon | |
| 7,684,549 B2 * | 3/2010 | Ying et al. | 379/88.17 |
| 2002/0085686 A1 * | 7/2002 | Cullis | 379/67.1 |
| 2003/0048882 A1 * | 3/2003 | Smith, II | 379/88.14 |
| 2003/0112938 A1 * | 6/2003 | Kanakubo et al. | 379/142.17 |
| 2004/0013245 A1 * | 1/2004 | Yokoyama | 379/88.1 |
| 2005/0185772 A1 * | 8/2005 | Chen et al. | 379/88.19 |
| 2007/0280439 A1 * | 12/2007 | Prywes | 379/88.18 |
| 2007/0286356 A1 * | 12/2007 | Goel et al. | 379/67.1 |
| 2008/0261564 A1 * | 10/2008 | Logan | 455/413 |
| 2010/0088290 A1 * | 4/2010 | Telschow et al. | 707/705 |
| 2010/0091957 A1 * | 4/2010 | Ying et al. | 379/88.13 |

FOREIGN PATENT DOCUMENTS

| WO | WO 9935807 A1 * | 7/1999 |
|---|---|---|
| WO | WO 0241825 | 5/2002 |

* cited by examiner

*Primary Examiner* — Mohammad Islam
(74) *Attorney, Agent, or Firm* — Loginov & Associates, PLLC; Keri E. Sicard; William A. Loginov

(57) ABSTRACT

A system, method and device for managing messages. A caller dialing a particular line has a message managing device operatively connected to the line, that records a copy of the message to be recorded on the line, such as on a conventional answering machine. The MMD includes ring detection circuitry to detect an incoming call. The copy of the message recorded on the line can be communicated to the appropriate user by correlating the incoming call data with a contact list or other preferences selected by a user. The user/recipient of the message can also be manually selected by the caller. The MMD can also implement a virtual phone application for creating a plurality of distinct, unique rings for one line, based upon the caller information.

9 Claims, 10 Drawing Sheets

2 = MMD AS AN ADD-ON BOX

2B = MMD RING DETECTION CIRCUIT

US 8,411,829 B2

SYSTEM, METHOD AND DEVICE FOR MANAGING MESSAGES

RELATED APPLICATIONS

This application claims the benefit of U.S. Provisional Patent Application Ser. No. 61/201,740, filed Dec. 16, 2008, entitled Message Mailing Device, the entire disclosure of which is herein incorporated by reference.

FIELD OF THE INVENTION

The present invention relates to recording and generally managing messages.

BACKGROUND OF THE INVENTION

When signing up for phone service, consumers with landline phones are faced with a choice as to whether the phone company record messages left by callers on their servers, or whether the user employ an at-home answering machine. There are advantages to both methods. With an answering machine, there is a very user friendly mechanical interface, the ability to quickly see how many messages there are, the ability to screen calls and listen to a message while it is being left, and the fact that playback is usually from a speakerphone making it easy to take notes.

Drawbacks to answering machines include the fact that the user can forget to check the machine to see if there are messages on it. Additionally, as the number of landline calls declines in favor of cellphone calls, messages are more likely to be stranded on the answering machine due to lack of use.

On the other hand, having the phone company record the messages eliminates the need for an answering machine in the house, allows for easy retrieval from other locations, lets a second caller leave a message while an earlier caller is on the phone, and in some cases, allows messages left by callers to be emailed to the owner of the phone. With the email feature, messages are more likely to be handled in real-time. Furthermore, messages are easier to manipulate once in digital form because they can be organized, transcribed and forwarded like regular email.

Several disadvantages of phone company-offered voice mail systems are that the user, depending on the type of handset, has to make the effort to pick up the handset to check for the presence of the tone signal indicating a message is waiting. Newer phones typically have a light indicator. But in most cases the user has to dial in to hear the messages, a cumbersome process compared with simply hitting a button on an answering machine.

SUMMARY OF THE INVENTION

This invention overcomes the disadvantages of the prior art by providing a system, method and device for recording and managing messages. The system includes a message managing device (MMD) that is operatively connected to an incoming telephone line. The MMD detects an incoming call using ring detection circuitry, and further detects when a message is going to be left based upon the absence of presence of someone picking up the telephone line. The MMD records a copy of the message left on an already existing answering machine at the incoming telephone line location. Alternatively, the answering machine can be integrated within the MMD to replace conventional answering machines.

The system further includes a message managing server that receives the copy of the message and transmits it to a particular user of the system. This can be based on caller information or preferences specified by the user. Additionally, the caller can be prompted by the system to determine which user will receive the message.

The MMD can be implemented in a virtual phone system, wherein the preferences specified by the users of the MMD determine which user is to receive the message. According to the virtual phone system, the phone has a unique ringer for each specified user of the system, and the caller information or other specified parameters by the user determine which user receives the call.

Additionally, the MMD can be implemented to send text messages or other communication mechanisms for informing the user of a particular message stored on the message mailing server database. The caller information for each incoming call is also transmitted to the message managing database so that full call data can be communicated to the particular user.

BRIEF DESCRIPTION OF THE DRAWINGS

The invention description below refers to the accompanying drawings, of which.

DETAILED DESCRIPTION

Figure 1:
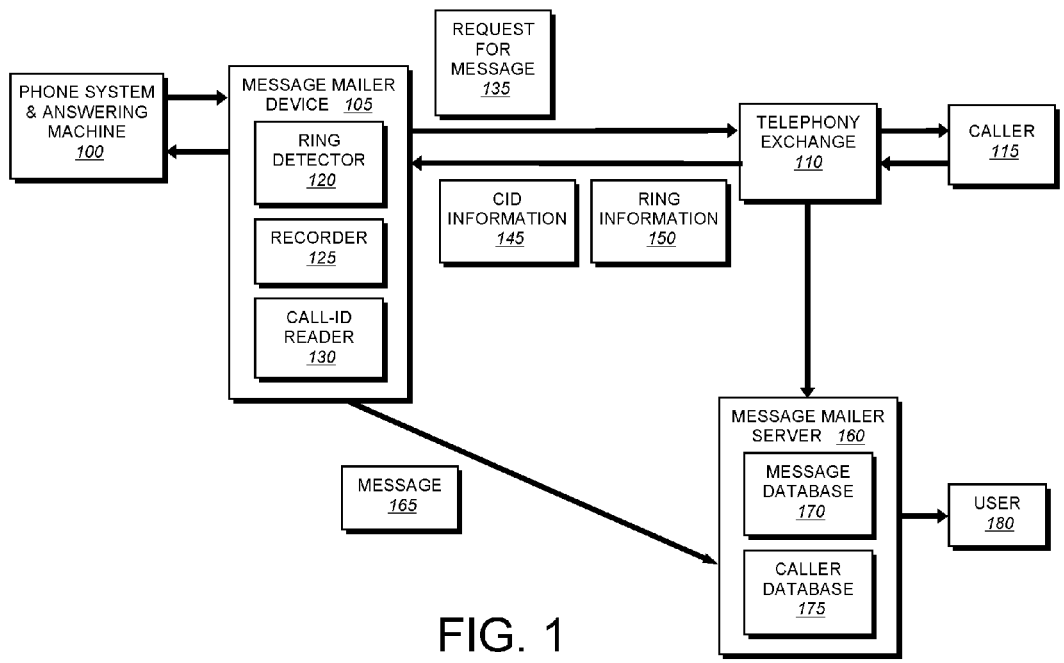
FIG. 1 is an overview block diagram of a system for managing messages according to an illustrative embodiment.

There is provided a system, method and device for managing messages. As shown in FIG. 1, in an illustrative embodiment, a phone system and answering machine 100 are supplemented by a Message Managing Device (MMD) 105. The MMD 105 enables consumers to enjoy the benefits of a conventional answering machine 100 at a first location while also being able to take advantage of several features offered by newer voicemail systems, such as forwarding to an email or cell phone or other location, distant from the first location where the original messages are stored. As described in greater detail below with reference to FIG. 2C, the MMD 105 has a ring detector 120 that detects an incoming call. The MMD 105 further determines when a message is going to be recorded on the MMD 105 by the recorder 125. The MMD offers any landline phone user the ability to have both the original "hard copy" of a caller's message left on the answering machine, as well as a "soft copy", which is appropriately communicated according to the procedures discussed herein that can correlate a particular user with each incoming call.

The MMD 105 also includes a call-ID reader 130 for obtaining caller ID information when a call comes in from a caller 115 through the telephony exchange 110. Caller ID information and ring information are transmitted to the MMD 105 via datastreams 145 and 150, respectively. The message recorded by the MMD 105 and other Caller ID data are transmitted to a message managing server 160 via datastream 165. The messages are stored in a message database 170 and the caller ID data is stored in a caller database 175. This information can be transmitted to a user 180 via other mechanisms including text messages, e-mails or other appropriate notification, as described herein in greater detail below.

Figure 2A:
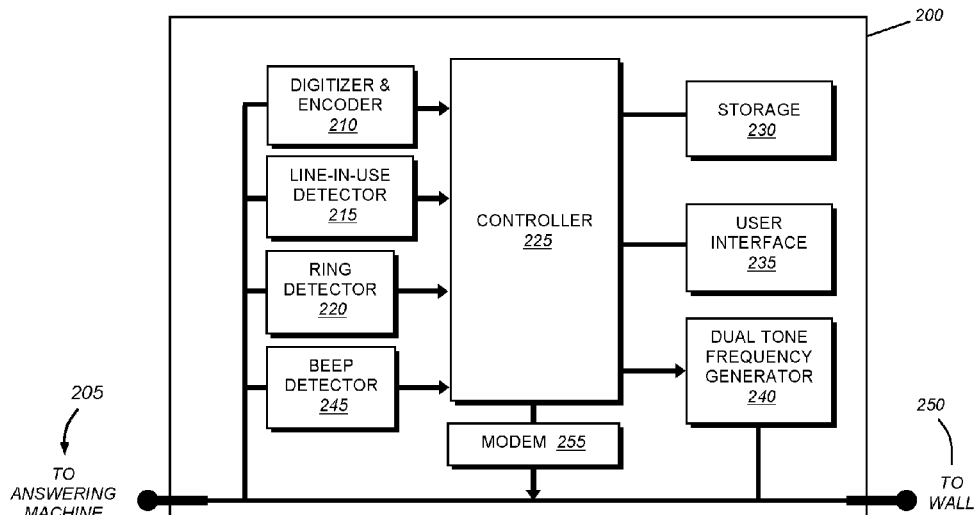
FIG. 2A is a schematic diagram showing the message managing device (MMD) according to an illustrative embodiment wherein the MMD is an additional element in the message managing system.

With reference to the schematic diagram of FIG. 2A, the MMD 200 can be an alternative recording device used to supplement an existing answering machine 205. Such a device can be plugged into any RJ-11 phone jack 250 in a household phone network. The basic structure of the MMD requires an alternative recording mechanism including a digitizer and encoder 210 to supplement an existing answering machine. This secondary recording mechanism monitors the beginning of a phone conversation and if it detects that a message from a caller is being recorded, will then start to make a second copy of the message being left and store it in storage 230 using the controller 225. This second copy is the soft copy that can be manipulated in digital form. There may also be provided a user interface 235 for displaying a message. The MMD can also include a dual-tone frequency generator to create a notification of a message being stored in the MMD. The MMD 200 further includes a modem 255 in communication with a controller 225 that determines whether a message or other data is transmitted to a message managing server.

Figure 2B:
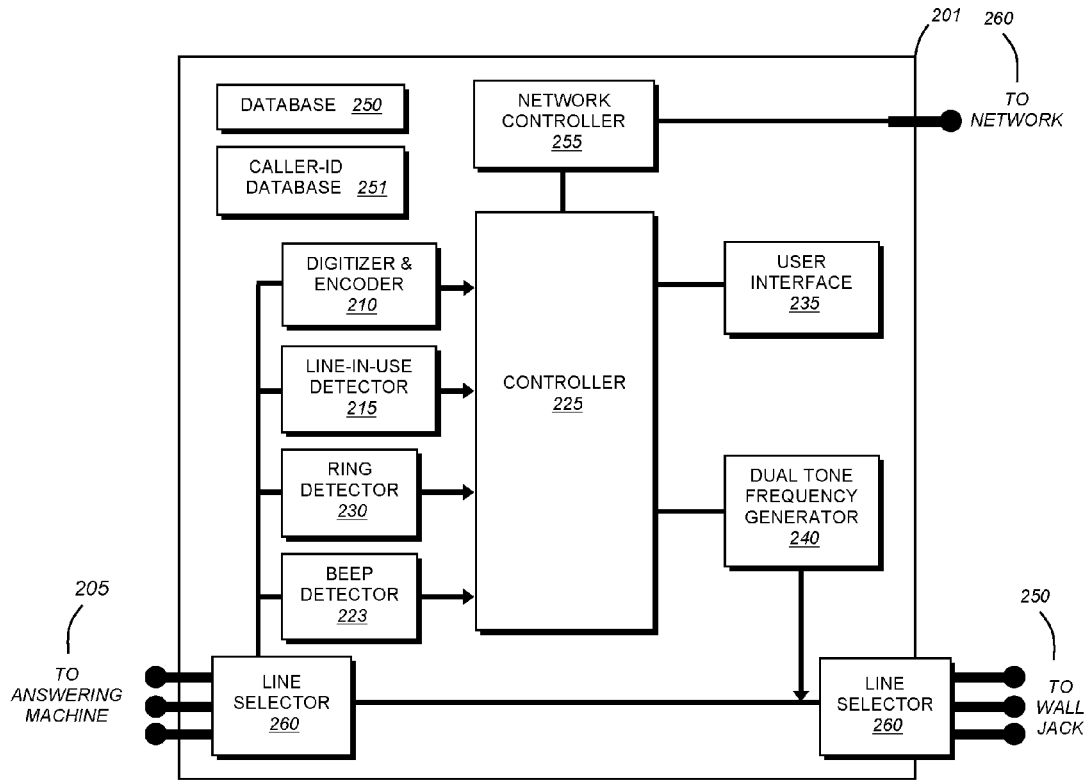
FIG. 2B is a schematic diagram showing the message managing device MMD) according to an illustrative embodiment wherein the MMD is a server of the message managing system.

As shown in FIG. 2B, the MMD can alternatively be implemented as a server device 201. This includes a database 250 including messages stored thereon and a caller ID database 251. This information is controlled by a network controller 255 to be transmitted to the network 260. The MMD as a server includes the same components as the MMD 200 of FIG. 2A, except that it further includes a line selector 260 for selecting the line that is monitored for recording and managing messages.

Figure 2C:
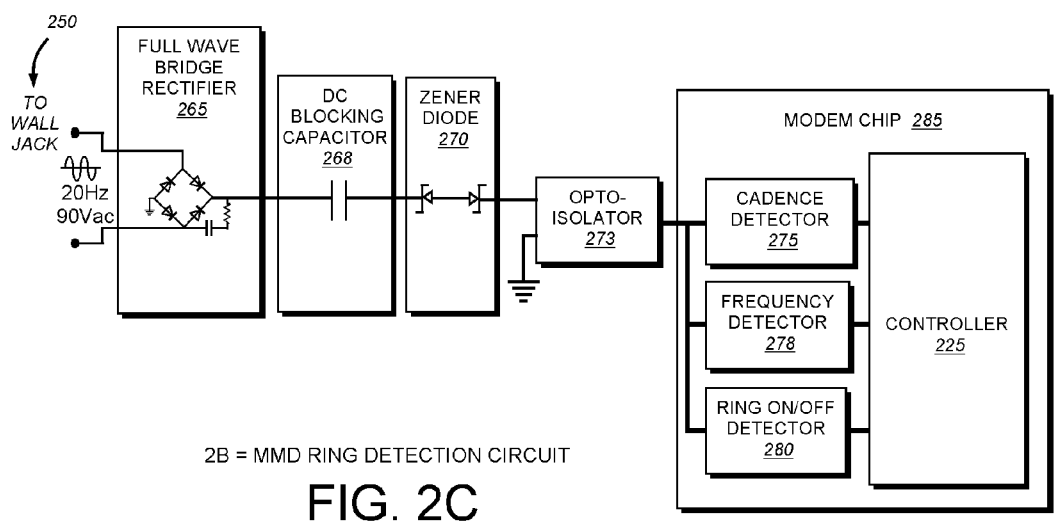
FIG. 2C is a schematic view of the ring detection circuitry of the message managing device (MMD) according to an illustrative embodiment.
Figure 3:
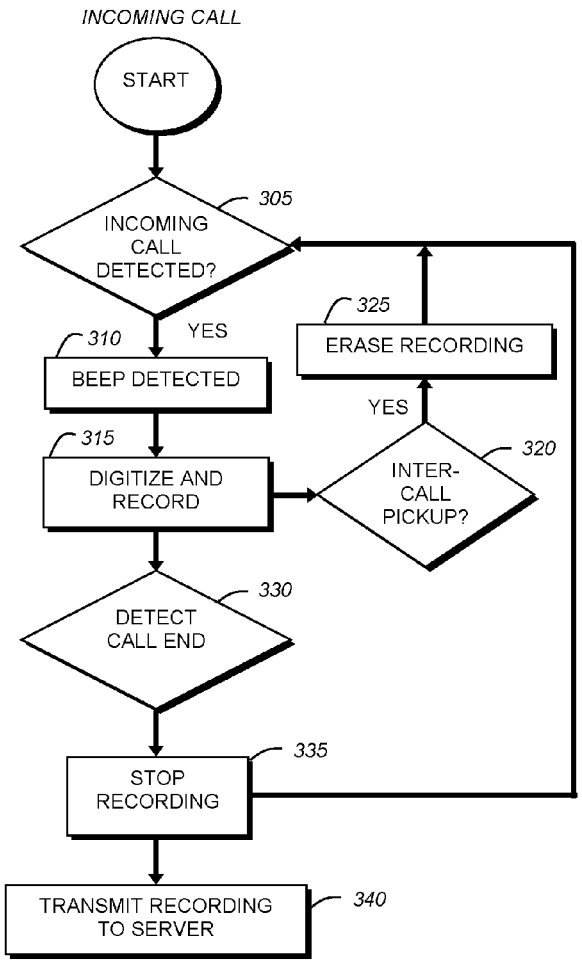
FIG. 3 is a flow diagram of a ring detection procedure implemented in the illustrative message managing system of FIG. 2C.

The MMD uses ring detection circuitry, as shown in schematic view in FIG. 2C, and according to the ring detection procedure 301 of FIG. 3, to detect when a call is coming in at step 305 and by monitoring the telephone line, to detect when another phone in the house or an answering machine has picked up the call. It will do this by using "Line in Use" (LIU) detection, via LIU Detector 215 of FIGS. 2A and 2B, or if the phone or answering machine is connected directly to the MMD, by monitoring that local connection. In an exemplary operation, if a beep is detected at step 310 of the ring detection procedure 301, the procedure digitizes and records a message at step 315. If the system detects that there has been an answer of the telephone at step 320, the recording is erased at step 325. The system then continues to detect an incoming call. If the recorded message continues until the end of the call, the end of call is detected at step 330, and then the recording stops at step 335. The recording is then transmitted to the message managing server at step 340. The MMD also includes standard circuitry to read CID (Caller ID) information associated with an incoming phone call and to store such CIDs in a database.

The ring detection circuit shown in FIG. 2C includes a bridge rectifier 265 to achieve full wave rectification of the signal from the wall jack 250. Together with a DC blocking capacitor 268 and zener diode 270, the incoming signal goes through an opto-isolator 273 to transmit the signal to the modem chip 285. The modem chip 285 includes a cadence detector 275, frequency detector 278 and ring on/off detector 280 that are operatively controlled by the controller 225 to perform the ring detection procedure of the illustrative embodiments.

Once the MMD detects that another phone extension has gone off hook after the phone rang and the call had been answered, the MMD also goes off-hook. The MMD's microcontroller, with or without DSP capabilities, then monitors sounds on the line using audio filters that can detect the unique frequencies of the sound of the "beep" produced by an answering machine "greeting message". Such frequencies typically range from 700 to 1200 Hz.

The MMD can improve the accuracy of its "beep detection" by comparing the time from line pickup to the detected beep to a previously determined amount of time it takes for the answering machine to normally pick up a call. (Some answering machines have two pickup times if they operate in "toll saver" mode. In that case, two time comparisons can be done.) In addition, the software can look for pauses that normally occur before and after the beep. More advanced beep detection software can even recognize the repeated pattern of the greeting message produced by the machine each time it answers a call and which precedes the beep.

If a beep was detected, the MMD assumes that the answering machine has picked up, delivered its greeting message, and is now preparing to record a message. The MMD then proceeds to record its own copy of any audio coming over the line following the sound of the beep, while the answering machine continues to make its own copy.

Upon sensing that the call had been terminated, the MMD recording stops. Alternatively, the MMD recording can be programmed to stop after a preset length of time.

After a certain period of time had elapsed following termination of the call, the MMD device dials out, over the phone line to which it is connected, to a phone number that is answered by the MMD server. Upon connecting with the server, the MMD plays back, in analog form, the message, or messages, it had digitized since the last time it communicated with the server. The server is programmed to accept such calls, record such audio messages, and associate them with the CID of the calling MMD. Once the MMD has completed playback, it erases the stored messages off of the local device.

Specific commands can be used to coordinate the transmission of messages between the MMD and the server. For instance, the server can produce a unique tone to signal to the MMD that it had answered the call and was ready to start recording. If more than one message was to be transmitted in a phone call, the MMD can produce a signal to notify the server.

The MMD also transmits to the server the saved CID of the party whose message was recorded when the message was passed to the server. Simple DTMF tones can be used to transmit such CID information about the recorded party.

In an alternative implementation, the MMD can transfer the message, and associated metadata such as CID information, via a modem to the server, thus keeping the recording in digital form. Many residential landlines, however, are now based on VoIP technology, and as such are not able to support higher speed modems. As a result, uploading the messages in analog is often faster.

When passing the message to the server, the MMD also communicates how much time had elapsed between recording the message and when it was transmitted to the server. With such time information, the server can deduce the time of the call without requiring a clock in the MMD hardware.

Upon receiving and digitizing the incoming message, the server can then email the audio file as an attachment to an email address associated with the CID that came with the message.

Alternative Communication Means

Other means of communicating the message or the existence of a message can be offered besides an email attachment. For instance, a text message notification can be sent to users' cell phones informing them that a new message has been forwarded to their email. In addition, the server software can transcribe the message's audio to text form and include such text in the email.

While MMD offers users access via email to their answering machine messages while away from the machine, there are many people who do not have access to email during the day. But many of these people do have cellphones. Thus, another implementation of the MMD offers a feature that deposits the message that was originally left on the home answering machine and recorded by the MMD directly into the user's cell phone voicemail without the cell phone ringing.

Slydial currently offers such a function—a service that lets a user input a cell phone number and then recite a message into that person's voicemail without ringing the phone of the called party. A new voicemail notification shows up on the called person's phone shortly after the message is left but the phone never rings. A similar service is offered by most mobile operators whereby one subscriber can "send a voice message" to another subscriber by entering one's own voicemail box, pressing a specific key, dialing the number of the party to be messaged, then reciting the message. The message then shows up in that person's voicemail box without ringing or registering as a missed call. That message displays to the user the phone's native notification that a new voicemail had arrived, however.

The MMD uses similar technology to route voice messages between a single user's various voicemail accounts. In this example, the MMD can be programmed to pass its messages to the user's mobile voicemail account without ringing the phone. This can bring immediate access to the MMD's messages to people who do not have ready access to email. The MMD can also precede the voice message with a greeting letting them know that the voicemail was from their home phone, along with providing the CID of the caller.

Figure 4:
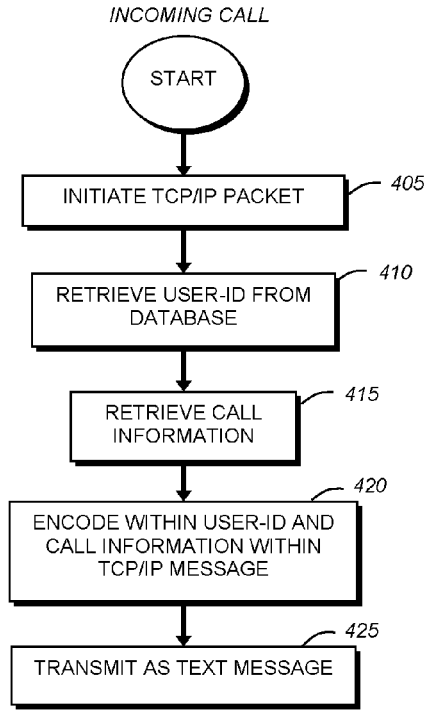
FIG. 4 is a flow diagram of a text message notification procedure implemented in the illustrative message managing system of FIG. 1.

With reference to FIG. 4, a flow diagram of a text messaging procedure 401 according to an illustrative embodiment is shown. The procedure begins at step 405 by initiating a Transmission Control Protocol/Internet Protocol (TCP/IP) packet to be sent as a text message. The user id is then retrieved from the database of the message managing server or message managing device at step 410. Next, call information is retrieved at step 415. The call information and user id are encoded within the TCP/IP message at procedure step 420. The procedure 401 is terminated at step 425 when it transmits a text message to the designated recipient. This is the voicemail account designated for a particular call. It may be a particular cell phone, landline, or virtual line as discussed herein.

Another means of communicating the information contained in messages recorded by the MMD can consist of transcribing such message and sending the first 140 characters of such transcription via a text message to the appropriate party, in a manner similar to a service offered by Phonetag. If the transcribed message was longer than 140 characters, it can be sent in parts in the form of multiple text messages. In a further innovation, the transcription can be processed by software that does auto-summarization. Such a feature is offered in the popular Microsoft Word software. Such summarization software can be programmed to reduce the size of the message down to the 140 characters that can fit into a single text message.

Such short messages, whether summarized or not, can also be automatically transmitted as private messages over communication systems such as Twitter or Yammer.

In summarized form or full form, such transcriptions can also usefully be transmitted to particular recipients via an RSS feed using standard techniques for creating such content streams.

Spoofing the Email Address

Presumably, landline messages are often from people with whom the MMD owner has regular email contact. In such cases it can be advantageous if the MMD owner were able to easily reply to an emailed landline audio message.

To accomplish this, the MMD server, can attempt to find an unambiguous email address that can correspond with each caller leaving a message. When the message from such caller was emailed to the appropriate party, the server can insert that caller's email address in the "From" field of the email, similar to the way spammers produce email with fictitious From addresses.

With such an address in the From field, the recipient can be easily able to merely hit the Reply button to reply to the emailed audio message. If the audio had been transcribed, such a reply method can be even more useful as the original caller can quickly be reminded of what was said in the first round of the conversation.

Operating without Beep Detection

In an alternative implementation, the MMD can detect when an answering machine message was being recorded by monitoring how many rings it takes or how long it takes for a call to be answered by the machine. In addition, the length of the greeting message can be considered. In such a configuration, beep detection can not be necessary or at least can not be the sole means used to start recording by the MMD.

All answering machines are designed to answer on a set number of rings. This allows users to know exactly how much time they have to answer the phone before the machine picks up. Such rings may be detected by the MMD via standard ring-detection circuitry. If the requisite number of rings occur, and then a phone goes off-hook as determined by the MMD's circuitry, then the MMD can assume that the answering machine and not a person had answered the phone call. If an answering machine is plugged into the MMD's local passthrough phone jack and it was the only device connected, then it can determine exactly if the answering machine itself has picked up the call. Of course, a person can have picked it up at the same time, or even after the answering machine had answered. Under those circumstances, the MMD can record all or part of that conversation. This type of accidental recording, of course, is a known problem today with answering machines and is accepted by consumers.

In order to use the above-described "ring detection" method or a similar time detection method to determine when the answering machine has answered, the MMD must determine how many rings it takes for the answering machine to answer—a setting that is usually adjustable by the user but rarely changed.

To determine this ring-number and greeting message length, the owner of the MMD can be instructed to plug the unit into any RJ-11 jack in the house. The microcontroller in the MMD can recognize that the unit had just been plugged in and can proceed to call the server using a pre-programmed phone number for the server that is stored in the microcontroller's memory. Upon receiving this "handshake" phone call from the MMD, the server can record the CID of the incoming call and can proceed to immediately call back the number associated with the CID.

The user can have been instructed to not answer the phone but let the answering machine pick up when the expected phone call came in right after plugging in the MMD for the first time. This is done to ensure that when the phone does go off hook, it is because of the answering machine and not the user. The MMD can then record the number of rings it took for the answering machine to go off-hook. This number can be stored by the MMD and later used to deduce when the answering has answered.

After the answering machine had picked up, the server can then listen to the greeting message and wait for silence of a certain number of seconds to deduce that the greeting message was complete. The server can then compute the length of the greeting message, from the moment the answering machine went off hook, and communicate that value to the MMD, which was still on the line. Such communication can be in the form of a simple DTMF tones that signified the length of the message. The call can then be terminated, perhaps after the server had left a recorded message on the machine with useful information for the user of the MMD describing the calibration process then going on. Now the MMD can have the ability to begin recording at the correct time based on the length of the AM's greeting message.

Alternatively, the MMD itself can measure the number of rings and the length of the greeting message if equipped with the software to discern when the message was over. In fact, the MMD can also be equipped with ring generation circuitry that can simulate an actual call and be used to "call" the answering machine, without the need for the server phone call, and thus calibrate the rings-to-pick-up for the answering machine. [Note that this is only possible if the answering machine is plugged directly into the MMD or the MMD is inserted before any other phone.]

Other implementations for systems that can calibrate the answering machine in order to instigate a recording by the MMD can involve combinations of the systems described above. For instance, beep detection can be improved in some cases if the processor knew how long after pickup the beep occurred or a pushbutton can be made available for the user to press when they hear the beep from the answering machine to tell the MMD how long after the answer the beep occurs.

Some answering machines are set up with a "toll-saver" option. This option is designed for users who call into their answering machines to check for messages. If there are no messages, the answering machine will ring, for example, 5 times before picking up and recording a message. If a message is on the answering machine, and has not been listened to, then the answering machine will pick up after 2 or 3 rings. Therefore when users call the house, and the phone rings 4 times, they can assume there are no messages and hang up.

To accommodate the active use of the toll-saver options, the calibration can be continued to incorporate a second call from the server (or the MMD if capable of performing such function). If the second call to the house were answered by the answering machine in the same number of rings as the first call, then the toll-saver option can be assumed to be off (The user can have been previously instructed to be sure there were no un-listened-to messages on the machines before starting calibration.)

Intelligent Email Directing

Figure 5A:
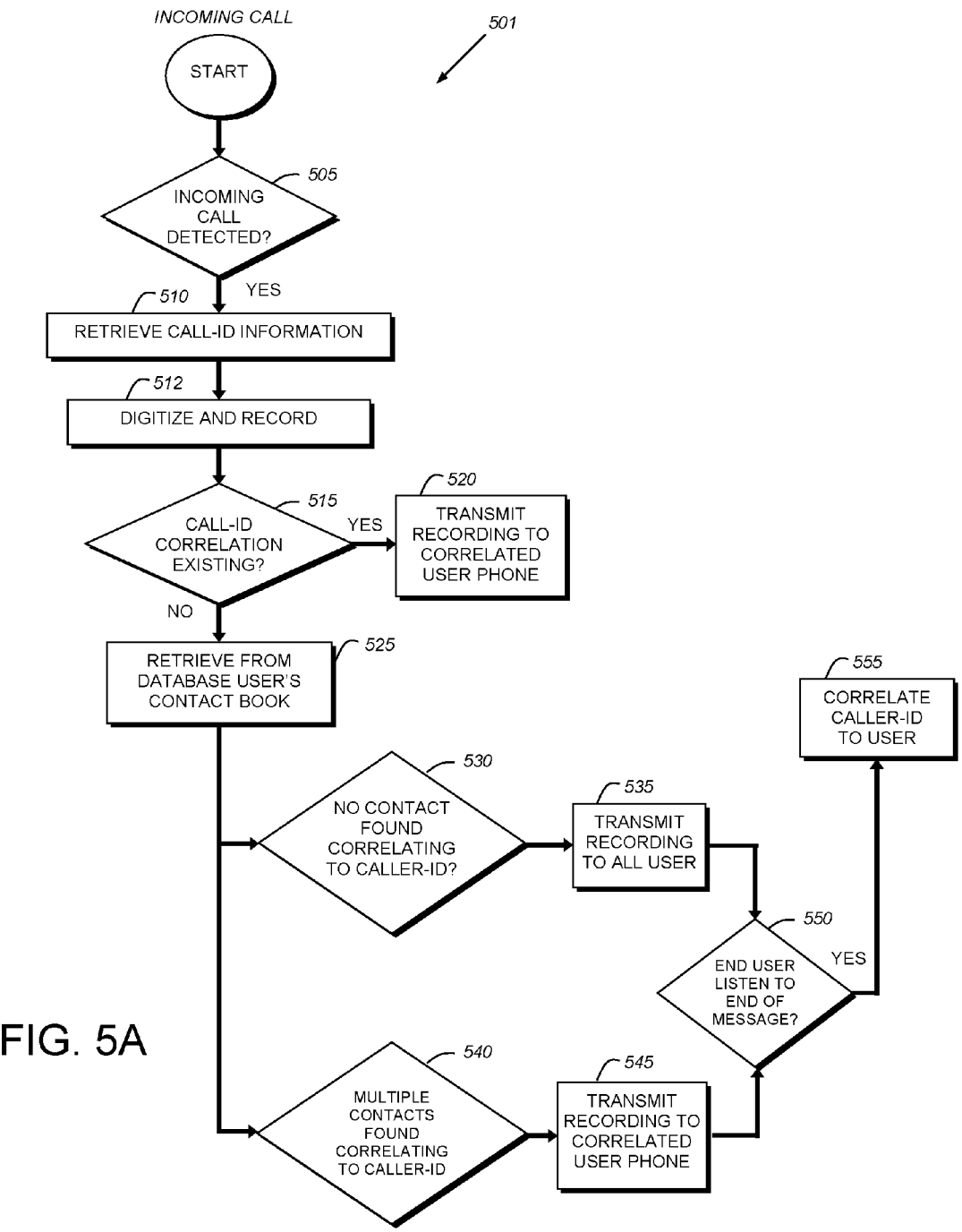
FIG. 5A is a flow diagram of an intelligent e-mailing procedure according to a user-trained embodiment of the illustrative message managing system.
Figure 5B:
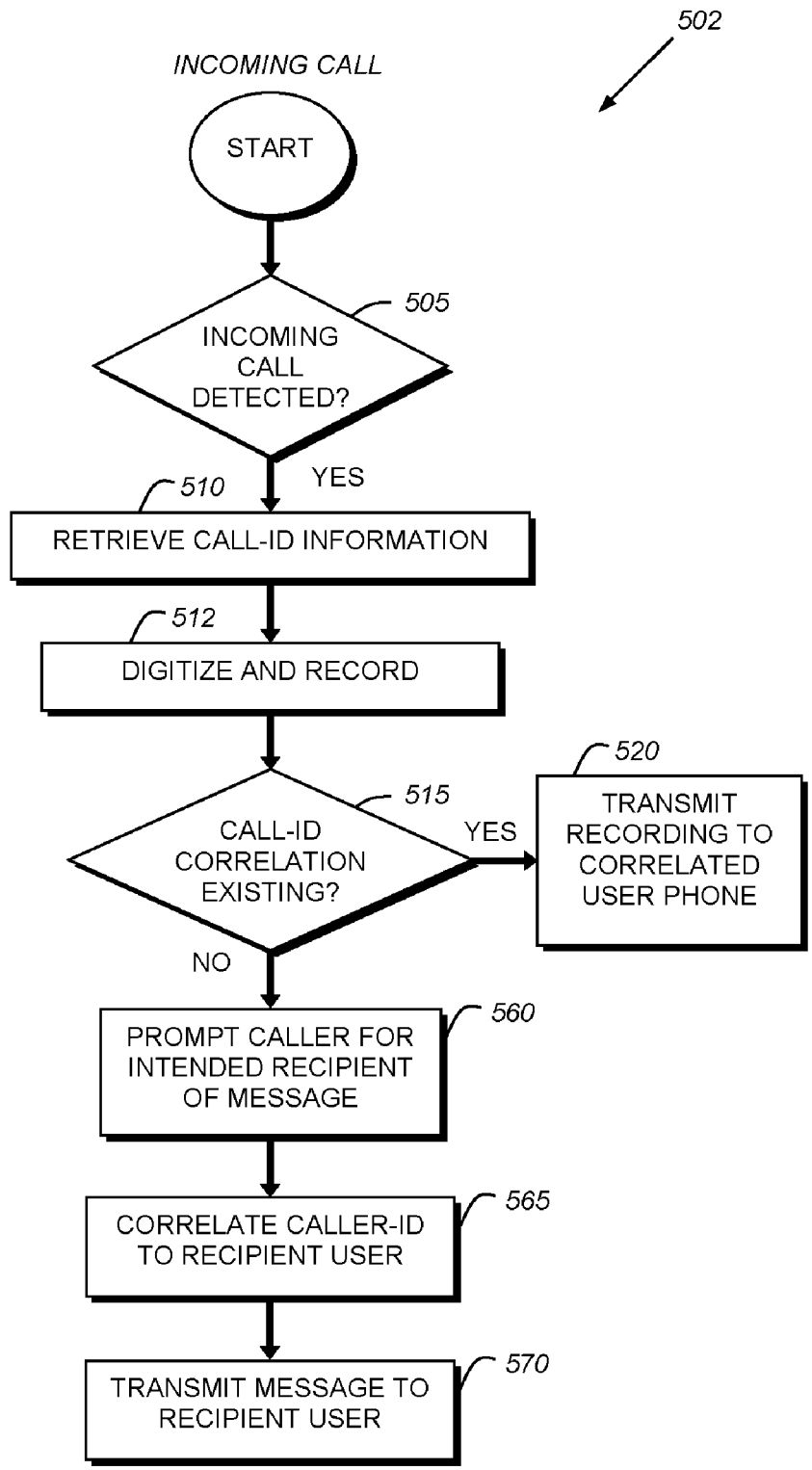
FIG. 5B is a flow diagram of an intelligent e-mailing procedure according to a caller-trained embodiment of the illustrative message managing system.

Referring to FIGS. 5A and 5B, the procedures 501 and 502, respectively, are shown for the smart routing algorithm. As shown in FIG. 5A, the user-trained smart routing procedure 501 is illustrated in the flow diagram where user settings determine message routing. FIG. 5B similarly shows a smart routing procedure, for a caller-trained procedure 502, in a flow diagram for a caller specified routing. Typically, a landline is used by multiple people in a household, and thus an answering machine can have messages for multiple people. In a user-trained procedure 501, as shown in FIG. 5A, the procedure begins with detecting an incoming call at step 505, and retrieving caller ID information at step 510. The caller trained procedure 502 similarly detects an incoming call at step 505 and retrieves caller ID information at step 510. A useful feature of the MMD can be to have members of the household upload their contact list to the MMD server. The server can then use the CID associated with each recorded message uploaded by the MMD and associate that message to one or more parties in the household. The MMD can then transmit (via email, text message, etc.) the messages and notifications only to the corresponding parties—the people whom the message was intended for in the first place. (Such sorting into individual voice boxes is done now in some answering machines but the caller has to listen to a preceding menu and press the appropriate button afterward.)

As shown in FIGS. 5A and 5B, the procedure then digitizes and records the information at step 512, and then at step 515, determines if there is a caller ID correlation already existing to determine which phone the message is sent to. If it is, then the recording is transmitted to the correlated user phone at step 520. When there is no correlation existing between the caller ID and the phone to which the message should be sent, each user-trained or caller-trained procedure differently determines recipient of the message.

According to the user-trained smart routing procedure 501 of FIG. 5A for automated routing of messages to a particular recipient, the procedure attempts to retrieve the caller information from the database of the user's contact book at step 525. If the contact is found, the message is forwarded to that particular user. If no contact is found correlating to the caller ID information at step 530, the recording is transmitted to all users at step 535. If multiple contacts are found correlating to caller ID at step 540, the recording is transmitted to correlated user phone at step 545.

According to the caller-trained smart routing (intelligent email directing) procedure 502 of FIG. 5B, the procedure then prompts the caller for intended recipient of the message at step 560 to determine where the message is to be sent. The caller id is then correlated to the recipient user at step 565, and then the message is transmitted to the recipient user at step 570.

Contact lists can be extracted from Outlook, GMail, Yahoo, or other applications with contact lists using Contact List Manager (CLM) software. The CLM can reside on a user's PC or mobile device to continuously upload changes to the server from the user's various contact lists. These contacts list are implemented at step 525 of the user-trained procedure 501 to determine which user is the recipient of a particular message.

In addition, the MMD can capture incoming and outgoing calls to the household line and add those to the contact lists used by the MMD server. In cases where just one person used the MMD, additions can also be passed back and added to that user's PC, mobile-based and other contact lists via the CLM. Note that the MMD and CLM can associate metadata concerning additions from landline use that recorded if the call was outbound or inbound. For inbound calls, the length of the call can be considered before adding it a list so as to prevent the addition of calls from telemarketers, wrong numbers, and the like. In other cases, multiple calls might be needed in order to qualify for addition to the list.

For MMD used by multiple people, the association of CIDs with specific household members can be done in a number of ways. One method can deduce who the major contact in the household was by monitoring which user listened completely to any given message when that message was sent out to multiple people in a household. This is determined at procedure step 550 of the procedure 501 such that the user ID is sent to the user after the end of the message.

Another method can simply be to have household members input on a web page the phone numbers of callers for whom they can like to receive messages, or select from a list of pre-existing numbers or numbers of active callers or called parties collected by the MMD over time.

Such selective communication of specific messages to specific household members can also be done for text messaging, and the direct depositing of messages into voicemail boxes as described above.

In another implementation of Intelligent Email Directing, callers themselves can direct their emails to specific parties. They can do so by pressing keys on their phone keypad at any point after the answering machine went off-hook. Preferably instructions on how to direct emails can be included in the greeting message. For instance the greeting message can say, "Thanks for calling. To have your message emailed to Sally, press 2. To have it emailed to Sam, press 3". Such keypad commands can be received and stored by the DTMF circuitry on the MMD and then passed along to the server to be used in directing email traffic.

Viral Message and Beep Shifting

In order to better market an MMD product, it can be beneficial for the service to have a viral aspect. That is, it can be desirable if the product can advertise itself to those who came in contact with it.

One such method of making the product viral is to insert an MMD message at the end of the user-created greeting message. Such a message might say something similar to; "Your message will be immediately emailed to the recipient by Message Mailer". This message can have the benefit of informing the caller that their message might reach the party being called much sooner than they might have thought. As a result, a different message might be left.

In inserting this message it can be important that there be a traditional beep at the end of the concatenated set of messages (the original greeting message combined with the MMD message). The beep is the cue for callers to start talking and no system message can be placed after it. Therefore, the beep can have to be shifted in order to insert the MMD message.

To accomplish the task of shifting the beep, the answering machine can need to be connected to the MMD's pass-through phone jack. The MMD can need to know when the answering machine's beep was about to be produced by the answering machine as determined in the calibration steps described above. Just before the beep, the MMD can momentarily disconnect the answering machine from the telephone line while making the answering machine think that it was still connected. This can be done with a relay and a local loop current source to simulate the connection to the CO.

The answering machine therefore produces the beep but the caller cannot hear it. Instead the caller hears a short audio announcement produced by the MMD followed by a different beep produced by the MMD. After the MMD beep is sent, the MMD reconnects the answering machine back to the telephone line to record the message as is normally done.

This disconnect can happen just before the beep was about to be produced by the answering machine as determined in the calibration steps described above. The answering machine therefore produces the beep but the caller cannot hear it. Instead the caller hears a short audio announcement produced by the MMD followed by a different beep produced by the MMD.

Converting Audio Messages to Video Content

It can be desirable to have the MMD emailing service be ad-supported. This can be done in standard ways such as placing ad presentations in the email that contains the audio file of the message left on the MMD. Another well-known technique is to have such email not provide the audio content directly, but rather a link that takes users to a web page where they can then listen to the audio. Such web pages can then present ads to the listener.

One implementation of the MMD invention however, can provide the further innovation of appending the MMD's recorded audio message to the end of a video ad. To hear the audio message left by a caller, the MMD user can need to click on a video clip, which can be 5-20 seconds in length. The video construct on the page can offer fast forward and random access, or alternatively, can only be played in a linear fashion with no skipping allowed.

When the ad was over, a static ad image can be left in the video window while the audio message played. Alternatively, the video space can be replaced with a transcription of the audio message.

The length of the video ad chosen for appending to the audio message can relate to the length of the message left. It can be annoying to watch a 15 second video in order to hear someone say, "See you then", but not as much to hear the caller recite a long-winded set of directions.

On-Demand Recording

One implementation of the MMD can allow users to record portions of conversations and have such portions emailed to a specific address. The recording can start at any point after the call had been placed (if the user was dialing out) or the connection made. The user can signal the MMD to begin recording (which it can not normally be doing as it can not have heard the answering machine beep) by pressing a key on the handset's keypad. Such a press can produce a DTMF tone that can be interpreted by the MMD as the signal to begin recording. A different key press can be used to stop the recording.

Figure 6:
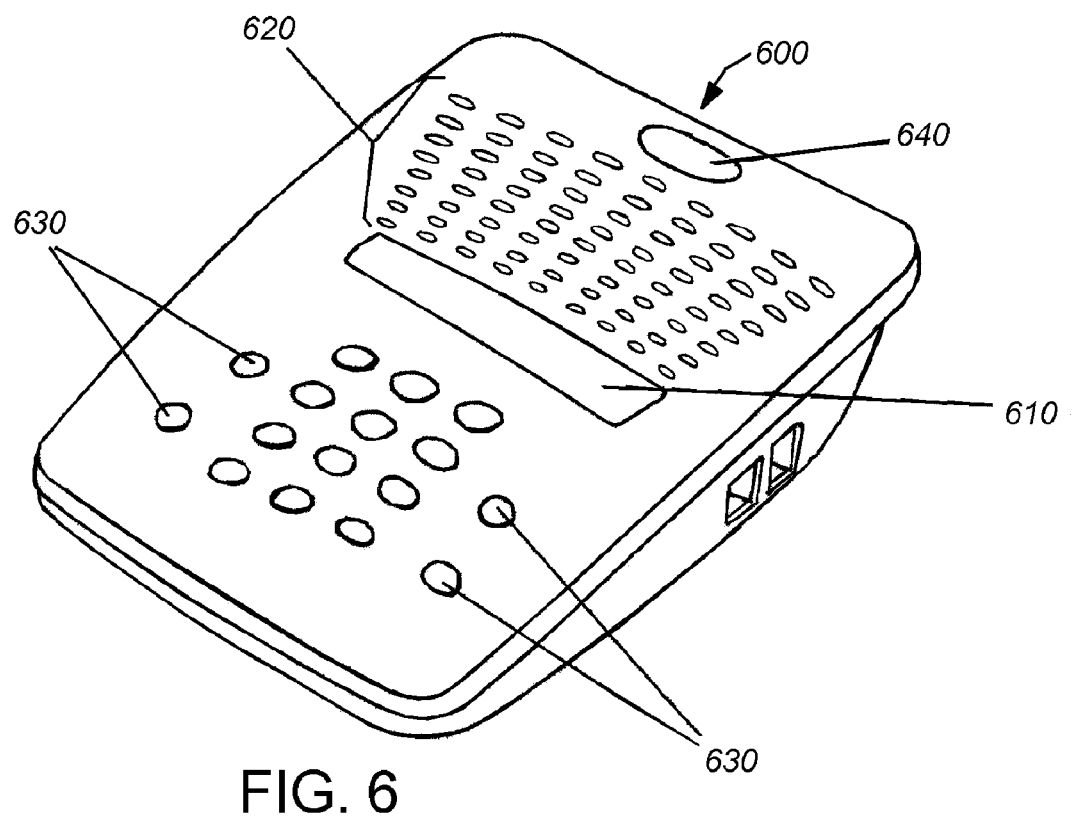
FIG. 6 is a front perspective view of the message managing device (MMD) according to the illustrative message managing system.

Such recording control can also be offered via buttons built into the MMD unit itself, as shown in FIG. 6. In this case, the other party on the line can not hear the DTMF tones. The MMD unit is shown in an exemplary implementation in FIG. 6. The device includes a display 610, speaker 620, and plurality of buttons 630 for controlling the various operations of the device. There is provided a button 640 for manually recording the message or other portion of the conversation, as desired.

If desired or required by law, the MMD can produce a beep or a short message to notify all parties on the call that the call was being recorded. Such warnings can be programmed into the unit by the user if needed or desired.

If segments of a given call were recorded, these segments can be concatenated into a single audio file or be kept as discrete files for emailing purposes. The user can program this choice into the MMD, or the decision can be made while on the call through the use of different DTMF tones one of which can signal a "stop" to the recording process, while another can signal a "pause".

The MMD can monitor the phone numbers dialed out by household phones that resulted in recordings, as well as recognize incoming CIDs when an incoming call was recorded. Such phone number information can be used to by the MMD server in deciding to which address to email the recorded message per the discussion above in Intelligent Emailing Directing. If such direction is ambiguous the resulting recordings can be emailed to a default address or to all related addresses, depending on how the MMD owner configured such settings.

In addition to, or in place of emailing the recording of the conversation, the MMD can maintain a copy locally on the device itself. The user can then access such recording via key presses to a handset. Such direct MMD-to-handset communication is described below in "The MMD as an Answering Machine".

Another implementation of On-Demand Recording can allow the party calling in to the household having the MMD to instigate the recording function by keying in the DTMF tones used to start and stop recording. This can be performed by conventional procedures for inputting a code for initiating the recording.

To offer greater control to the owner of the MMD device, the DTMF codes used to control recording can be programmed by the owner and thus made secure. In this implementation, children in the household can not be able to create recordings and people that call into the house can not be able to instigate a recording by virtue of knowing the other party has an MMD with standard recording controls.

The interface to program the MMD with recording codes can be online and such code creation can be handled in the same secure fashion used to input the email addresses to which messages are sent.

The MMD as an Answering Machine

In addition to supplementing an answering machine by transmitting its recorded messages to a server, the MMD can also serve as a standalone answering machine by giving users local access to the messages contained on the device. \The MMD answering machine can offer an interface through the use of the keypad on other phone handsets in the house in much the same way that today's cordless base station/answering machine units allow all remote handsets be notified of and to retrieve messages.

Figure 7:
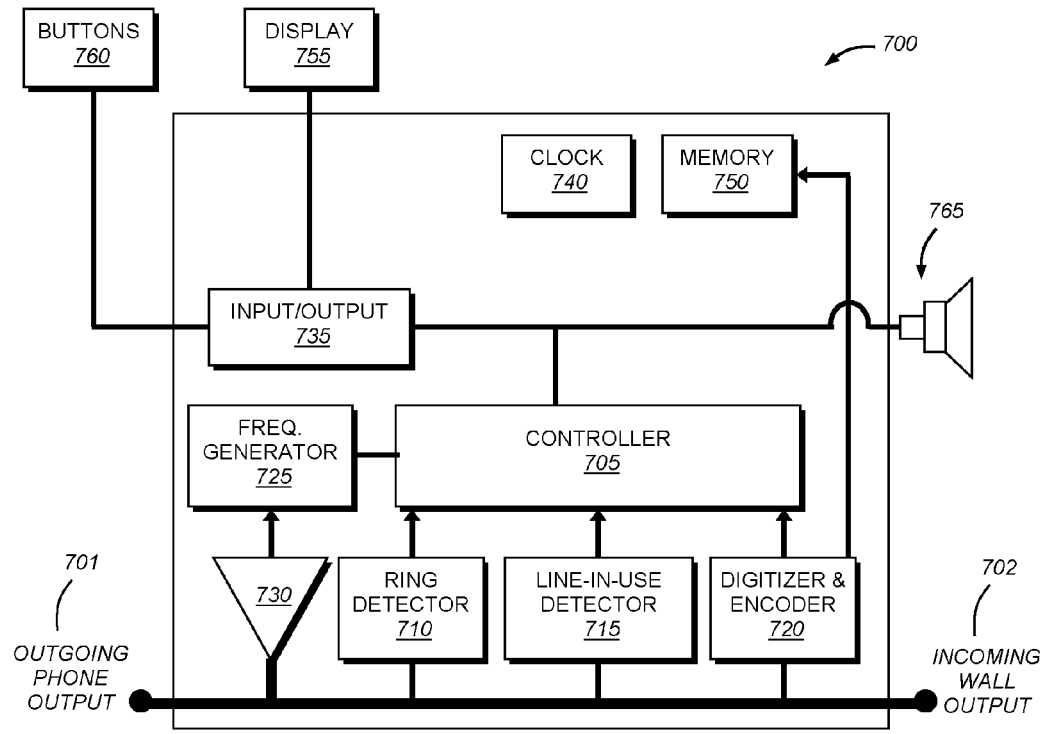
FIG. 7 is a schematic view of the components of the message managing device (MMD) according to an illustrative system wherein the answering machine and phone are an integral unit.

As shown in FIG. 7, there is provided a standalone MMD 700 having answering machine and phone integrated therein. It is operatively connected to the wall input 701 and outgoing phone input 702. The MMD 700 includes a controller 705 that performs the procedures described herein for managing messages. The ring detector 710, line-in-use detector 715, and digitizer and encoder 720 are operatively connected to the incoming wall line 701 to detect an incoming call and record a message as appropriate in memory 750. The MMD 700 further includes a clock 740 used to timestamp the message that is stored in memory 750. There can further be included a display 755 for displaying the presence of messages or other pertinent information, and buttons 760 for interfacing with the MMD. A user can review the display 755 and manipulate buttons 760 to listen to messages recorded on the MMD via speaker 765. An input/output mechanism 735 is controlled by controller 705 to perform the replay of messages through speakers 765 of to input a selection via buttons 760.

To function as a standalone answering machine, the MMD can need to be programmed with a greeting message, a pass code interface for remote access, a method for counting both listened to and un-listened to messages and reciting such data to users when needed, and an interface (such as buttons 760 and display 755 of FIG. 7) to perform normal voicemail functions such as erasing messages. A web interface can be used to accept and download greeting messages and pass codes or it can be done via a phone keypad as is currently done for voice mail systems.

A desirable interface for such an implementation of the MMD can be to have users employ their existing landline handset to communicate commands to the MMD. In order to use such handsets as an interface for the MMD answering machine, it can need to have the ability to communicate directly with the phone handsets in the house that are connected to the home phone network. Such communication, between a unit storing messages and remote handsets, is offered today in wireless phone systems where messages are stored in a base station answering machine and are able to be retrieved or listened to through the use of the handsets. Cordless handsets compatible with such base stations are able to communicate with the base stations using proprietary radio signals however, and not communicating over the phone line per se.

The MMD device, while compatible with all landline phones and related answering machines in its ability to make duplicate copies of recorded messages, does not have the ability to communicate directly with proprietary handsets through their proprietary radio protocols. It can only communicate with them when both devices are "on-line", that is both are receiving the same dial tone. When a handset goes off-hook and connects with the CO of the phone company, the MMD, which will also go off-hook when it detects a line in use, can detect any keypad press or DTMF tone it produces. The first keypad press will suppress the dial tone that the CO sends out. The MMD can then detect any further keypad entries. For example, the first keypad press can be the "*" key which will not be interpreted by the CO as part of a valid phone number but can alert the MMD that the next keypad presses are for it to decode. Such DTMF tones can therefore be used to communicate with the MMD. But if a call to an outside party is not completed within a certain time period, the CO will start to produce a loud noise indicating to the person "tying up the line" to hang up, thus limiting the amount of time that the handset and MMD can stay "connected".

To solve this problem, one implementation of the MMD can have circuitry that emulates the CO's dial tone. The household base station 702, controlling the handset used to access the MMD, can need to be plugged into MMD, which in turn is plugged into the CO phone line 701. The MMD can have a relay 730, which may be mechanical or electrical, or switch that can disconnect the base station from the phone line—a connection that can otherwise run through the MMD. The MMD includes a frequency generator 725 to generate the necessary tones for the implementation of the MMD, or any other signals for operation of the MMD.

If the user picks up a handset to dial, the call will go through as intended. However, if the user presses a specific code, such as **, a DTMF tone that will be ignored by the CO, the MMD will be programmed to understand that the user wishes to communicate with the MMD and will open the relay that will disconnect the base station from the CO.

The user can then issue commands to the MMD answering machine by manipulating the keypad on the handset. When the MMD detected a command to play back messages, it can play back such messages from its memory, even though such messages may have been already sent to the server to be emailed. In this way, the MMD interface can be very similar to the interface used by mobile, PBX, telco-operated landline voicemail systems. When the user is finished, the controlling phone is hung up, which is detected by the MMD, thereby placing the system back in its normal mode.

Often telco-operated landline voicemail systems will produce a special signal over the PSTN to tell a local handset in the home that a caller has left a message in the user's voicemail box. Such signal then prompts the handset to illuminate a small red light on the handset alerting the user that a message needs to be retrieved from the voicemail server. Accessing such indicated messages involves dialing the server's number or using a set speed-dial if the number has been programmed in to such a button.

Alternatively, users can be alerted to the presence of messages in their voicemail box by the generation of an alternative dial tone with a stutter. While a useful signaling technique when the handset is not able to follow the protocol to turn on the red light, this method suffers from the disadvantage of having to pick up the handset to know whether a message is waiting or not. The MMD answering machine implementation, in a manner similar to the telco voicemail server, can generate such standardized signals when it had messages waiting to be reviewed.

Many users are familiar with the keypad interfaces used to access various voicemail systems such as their mobile or work-related PBX voicemail. The MMD server can therefore offer users the option of selecting an MMD answering machine user interface (UI) that can emulate a system with which they were familiar. This UI selection can be communicated to the user's MMD device that can then switch its UI to the one selected. The user interface can be a display 755 on the MMD and appropriate buttons 760 for receiving appropriate input to the MMD.

Traditional voicemail systems also allow users to dial in from any phone to retrieve messages. The MMD can allow for such functionality as well. When a user called their home number, and the call was connected, the user can input a keypad command that can be understood by the MMD to mean that a user wished to access messages. The MMD can then ask for a pass code in a manner typical of voicemail systems. Upon successful entry of the pass code, the selected emulation UI can then be used by the caller to access the voicemail. Note, that when the answering machine function of the MMD is accessed from a house phone, a pass code can not necessarily be required if the user deemed that the MMD answering machine needed no more privacy than its mechanical equivalent that normally does not have a pass code requirement.

Bypassing the Answering Machine

Traditional answering machines have an advantage of being readily accessible to any member of the household. A related disadvantage is that caller may not be able to leave private messages for one or more household members.

The MMD addresses this problem with an implementation that allows certain callers, or callers under certain conditions, to bypass the regular answering machine and leave a private message. Such a private message can be recorded on the MMD but not the answering machine.

This functionality can be accomplished by disconnecting the answering machine that can be attached to the MMD when it was desirable to leave a private message. Such disconnect can be accomplished by using the relay circuitry described above, thus preventing the answering machine from receiving the call. The MMD can then be programmed to act as an answering machine as described above, offering its own greeting message.

Such a feature can be implemented in several ways. The user of the MMD can designate that specific callers' messages be taken directly, and solely, by the MMD with such callers being determined by their CID. When such a designated caller called in, the CID can be recognized by the MMD, which can then pickup the call before the answering machine was programmed to answer. Alternatively, a relay, as described above, can be used to disconnect the answering machine from the CO allowing the MMD to answer the call at the time normally reserved for the answering machine to pick up.

In another implementation, the caller can make the decision as to whether the message being left can be placed on the answering machine. For instance if the caller was the MMD owner, such owner might wish to create a message that can be emailed back to such owner. In this case, when the call was answered and the answering machine and the MMD were both off-hook, the caller can enter a command from a phone's keypad. Such a DTMF tone can command the MMD to disconnect the answering machine using the relay. At that point the MMD can be programmed to offer a new greeting message or the caller can bypass that with another key press and simply leave a message.

When the MMD was taking was taking a message and replacing the answering machine, it can need to offer a greeting message and in other ways behave as a voicemail service, as described above. Local retrieval functions can be offered, or alternatively, the user can solely be serviced by having messages emailed.

The MMD as a Call Screener

The MMD can also serve as a call-screening device allowing the household to control who can ring through to the house, and when such ringing can occur. There are multiple solutions to this call screening problem offered today, including the server-based approach offered by Google Voice as well as a local device solutions such as the Ooma VoIP phone. In both cases, calls can be screened by time of day and caller and other parameters. Google Voice is an example of this being done as the calls pass through the server while Ooma is an example of a VoIP-based phone product with enough intelligence in the unit to handle such functions.

The MMD is set apart from these other approaches to meeting the call screening need in that it involves the addition of a small, intelligent module to supplement the one's current landline system. To offer this set of call screening features, the MMD includes a speaker, while the other phones in the household have their ringers on mute. In this manner, the MMD can control the household ringing behavior.

In one exemplary implementation of the MMD, the unit does not have a speaker. Instead it has circuitry to connect and disconnect phones that are plugged into it. Ideally, the house is equipped with a base station phone controlling satellite handsets that ring when the base station phone rings. The MMD is connected in series between the telco's Central Office (CO) and the base station phone.

The MMD performs call screening by disconnecting the base station phone from the household phone line while waiting for calls to come in. This can be done, however, in such a way that if a household member went to use one of the "disconnected" phones, the MMD can sense that that handset had gone off-hook and reopen the line.

In an illustrative embodiment, a user's cell phone can be equipped with a communication mechanism, such as Bluetooth or other appropriate devices, for communicating with the MMD. When desired for the cell phone to exchange call screening settings with the MMD, the devices can communicate and exchange such settings so that the cell phone acquires the MMD settings. For example, when the cell phone is proximate the MMD, the devices can exchange settings so that they are the same. This is useful if, for example, the call screening features of the MMD prevent certain phone calls, then the cell phone will also screen out those particular calls. A user that has decided they do not want to be disturbed on their landline, or other line at the MMD, will not be disturbed on their cell phone.

Figure 8:
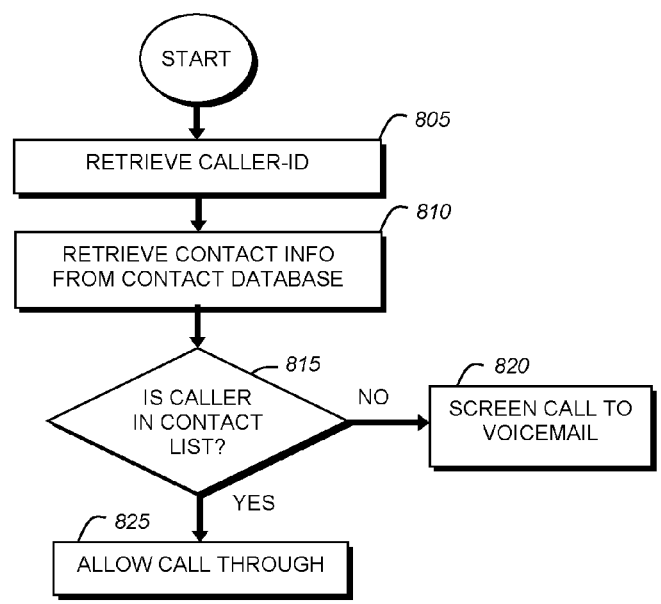
FIG. 8 is a flow diagram of a call screening procedure according to an alternate implementation of the illustrative message managing system.

The procedure for call screening is shown in the call screening procedure 800 of FIG. 8. When a call came in, the MMD can read the CID, which comes in between the first and second rings, and if it approved of the call (based on CID and any other parameters such as time of day programmed into the unit) then the MMD can establish a connection with the base station phone allowing it to ring on the second and subsequent rings.

As shown in FIG. 8, the procedure retrieves contact information from the contact database at step 810, and determines if the incoming caller is in the contact list at decision step 815. If the caller is not in the contact list at step 815, the procedure screens the call through to voicemail at step 820. However, if the caller is in the contact list, the call is allowed through to the user at step 825.

With such an implementation, the MMD can perform typical call screening features such as controlling what times of day the phone can ring, what callers can ring the phone and at what hours, etc.

In another exemplary implementation, the MMD can have its own speaker that can serve as the main ringer for the house. This can be accomplished by having the user putting the other household speakers on mute. In this implementation, any phone in the house can be picked up at any time and used at any time—they just can't ring. In addition, the MMD can be plugged into any household jack, and the base station phone can not necessarily need to be connected with the MMD between it and the CO. The MMD can perform the same call screening function described above. If the call was approved, however, the MMD can ring instead of instigating the ringing of the base station as described above.

It normally takes one to two rings for the CallerID to be communicated over the phone line. While the CSD can be quiet during this interval, another option can be to emit a soft tone to let the household know a call is being "looked at". Such a subtle tone can be a reminder to members of the household of the value offered by the product.

In addition to the call-screening feature mentioned above, this implementation of the MMD can provide for "smart ringing" features. First, it can bring the mobile feature of ring tones into the household by being able to have ring tones downloaded to, and stored by the device. The user can also control ring volume and duration. Different ring tones, volumes, and durations can be associated with calls coming to different people in the household, or some specific callers or classes of callers. The CLM software can establish such relationships.

Many of the call screening functions to be offered by the MMD can be based on downloading phone numbers and their relationships with household members from the contact lists of household members that had been assembled by the CLM software. With such numbers stored locally in the MMD, caller IDs and the metadata about such CIDs can be analyzed before ringing commenced in the household. If a call came in that was not recognized, the MMD can decide to not even ring the phone but just have the caller leave a message with the MMD. (Such a message can not reach the answering machine itself.)

All such associations of volume, ring-tone, etc, with users and contacts can easily be accomplished with an easy-to-use web interface that offered a set of rules to apply to specific callers along with specific over-ride capabilities. Such relationships and data can be downloaded to the MMD via a modem in the MMD.

A mini-IVR (Interactive Voice Response system) function can also be used to route calls of unknown origin. For instance, if a CallerID was not recognized, the unit might go off-hook and ask the caller a simple question requiring a numerical response that can be input via the keypad. For instance, the IVR might ask how many children were in the household, a question that only friends of the family might know. Specific answers can shunt the call to voicemail while another can allow the call through.

The MMD can further be programmed to bypass the physical answering machine in specific cases (even when the CallerID is recognized) and function itself as a "soft answering machine". That is, if an incoming call was determined by CallerID to be a home-business call (and messages from such calls did not need to be stored on the household physical answering machine), then the MMD itself can serve as an answering machine by going off-hook before the physical answering machine. It can offer the caller a personalized message based on who was being called and who the caller was.

"Ring-My-Room"—A Virtual Phone Line

Today, while some families have more than one landline number (for an at-home business, teenage daughter, etc.), others use a service offered by phone operators where multiple phone numbers are routed to the same landline so that children and other family members can each have their own number with its attendant unique ring.

Figure 9:
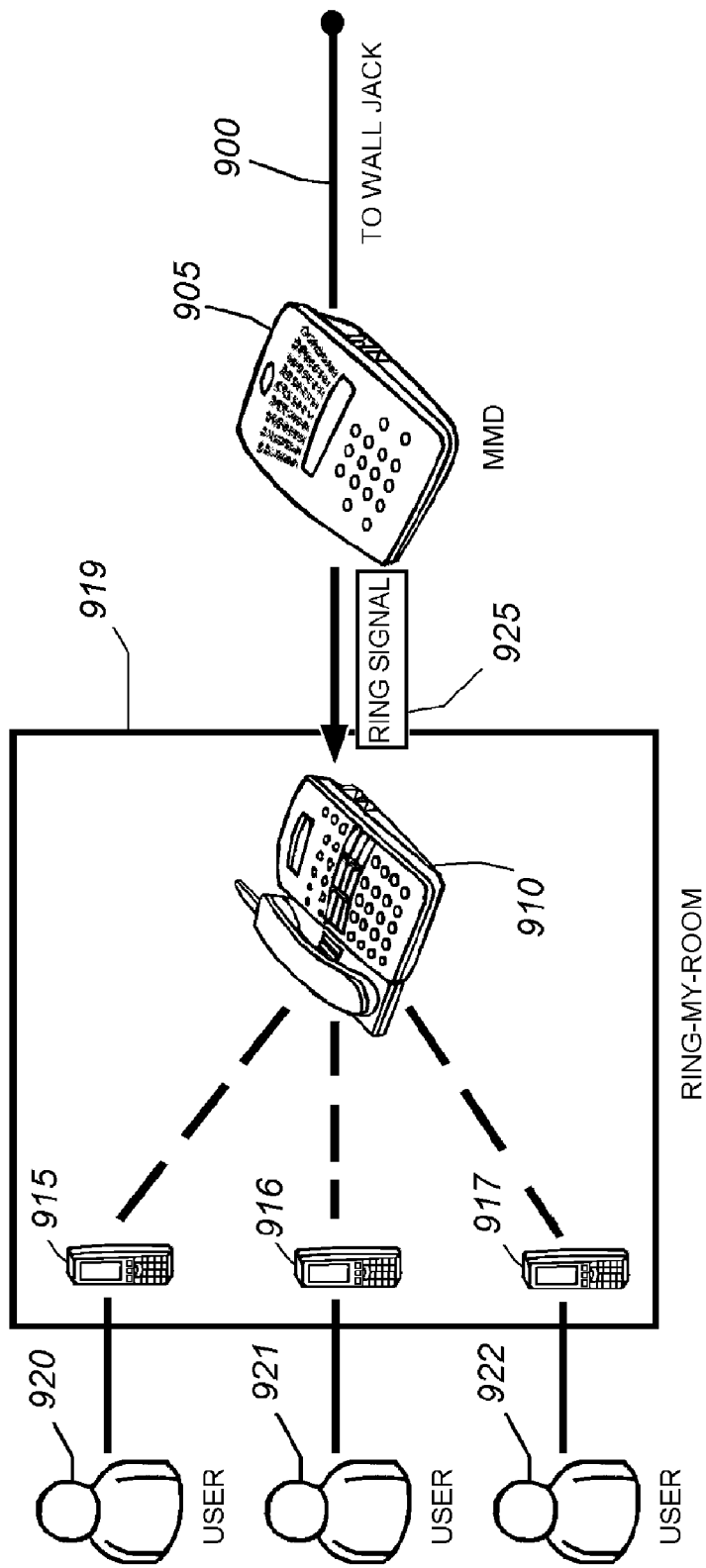
FIG. 9 is an overview block diagram of a virtual phone line system for managing messages according to an illustrative embodiment.

The Ring-My-Room (RMR) system 919 of FIG. 9 provides additional virtual phone lines into the house without having to install and pay for a second phone number from the phone company. As shown in FIG. 9, the MMD 905 is connected to the wall jack 900 to detect incoming calls. Upon determining the appropriate number to be dialed according to the procedures discussed herein, the MMD 905 sends a ring signal 925 to the RMR system 919. The RMR system 919 creates a plurality of ring tones 915, 916, and 917 for one handset 910 to create virtual phone lines for multiple users 920, 921, and 922. Accordingly, the ring signal 925 transmitted to the phone 910 determines which virtual device 915, 916 or 917 receives the call, implemented as a unique ring for each user 920, 921 and 922.

The RMR can work in conjunction with an MMD that was operating in call screening mode. It can be a low-cost hardware device with an RJ-11 jack, speaker and a means to communicate with the MMD in a simple way. An alternative to plugging the RMR into a wall jack can be for the RMR and the MMD to communicate wirelessly, for example using Bluetooth, wiFi or other appropriate wireless signal. The RMR can reside in a particular room in the household.

Figure 10:
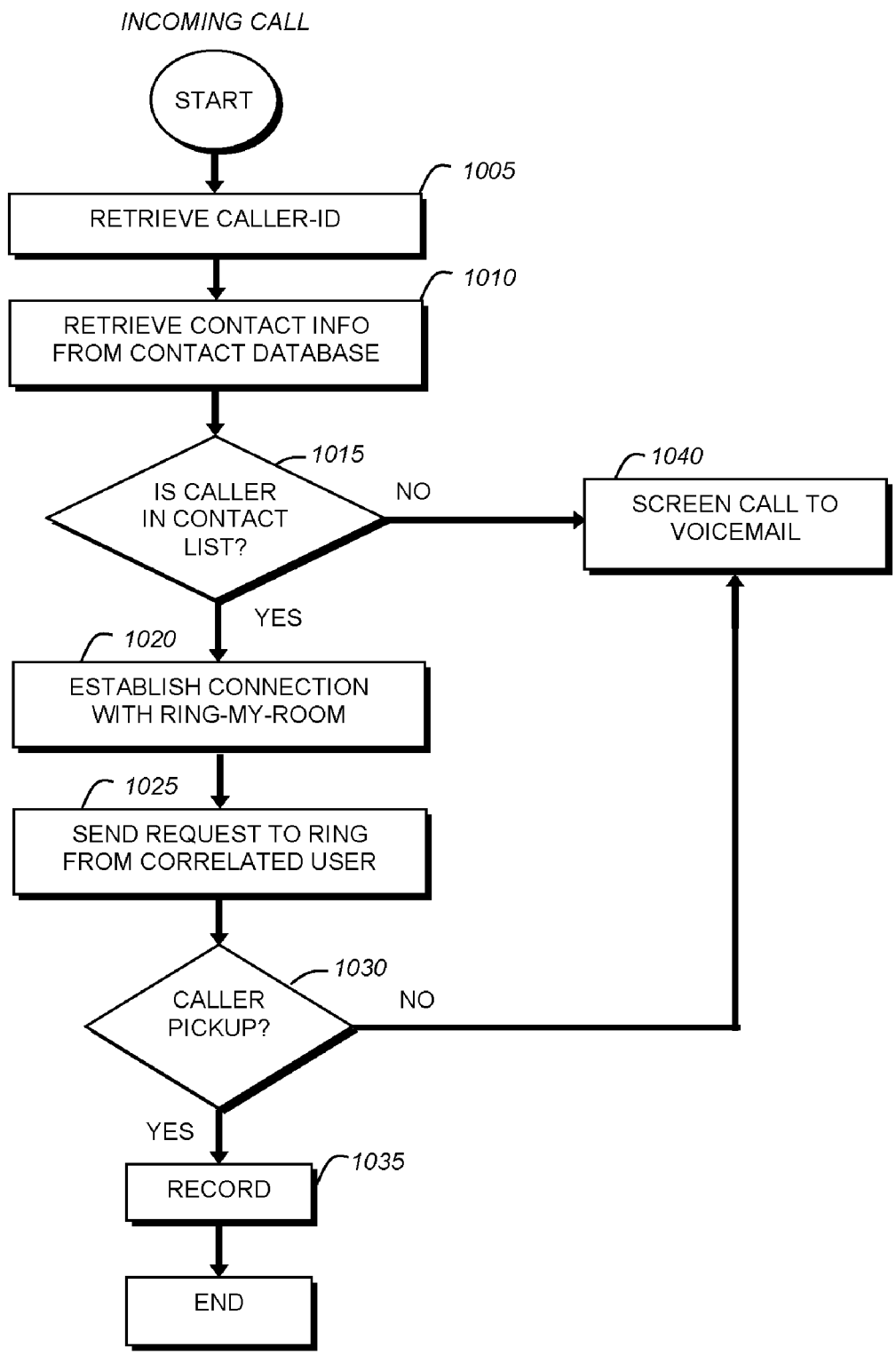
FIG. 10 is a flow diagram of the virtual phone line system for managing messages according to the illustrative embodiment of FIG. 9.

The procedure for the RMR application for virtual call forwarding to generate unique ring tones is shown in FIG. 10. When a call is dialed into the house, the MMD retrieves CID information at step 1005 to associate the call with the probable household member (either user 920, 921, or 922, for example) with which the caller wished to speak. The MMD retrieves contact information from a contact database at step 1010 to be used to determine whether the caller is in the contact list at decision step 1015. If the caller is not in the contact list, the call is screened to voice mail at step 1040. If the caller is in the contact list, the connection with the ring my room application is established at step 1020, and a request to ring from the correlated user is sent at step 1025. If the caller does not pick up at decision step 1030, the procedure sends call to voicemail at step 1040. If the caller does pick up, then the MMD records the message that is left at step 1035. If such an association to correlate the user can not be made, the MMD can use an internal IVR system to establish with which household member a caller wishes to speak. In this implementation, the MMD can answer the call without ringing the household phones and present a question to the caller. The answer can be in the form of verbal response that can be recognized by the MMD or a keypad response that can be interpreted by the MMD software as an indication that the caller wished to speak with a specific person.

When a call came in for the user of the RMR, neither the main household phone nor the MMD, if such MMD provided a ringing function, can ring. Instead, the MMD can send a signal to the RMR to ring, as shown at step 1025 of FIG. 10. In essence, the RMR, in conjunction with the MMD, takes an existing handset in the house and makes it behave as if it were connected to a separate line by virtue of the fact that specific callers can be routed to this specific phone. In effect, the combined RMR and MMD system behaves like a very simplified PBX switch in the house where the MMD serves to ring the main household phone and the RMR ringing the second "virtual line". (Of course, only one call at a time can go over the system.)

The RMR can work in one of two fashions. In one implementation, it can sit between the CO and the phone in the room. The phone connected to it connects the MMD to the base station phone when the MMD was working in call-screening mode. When a call came through that was intended for the RMR user, the RMR can allow the phone connected to it to ring. The RMR can not necessarily need a speaker for this implementation.

In a second implementation, the phone in the room can be muted and ringing in the room can be done by an RMR that had a speaker or ringer. In this implementation, the handset in the room can not necessarily be connected to the RMR.

In either implementation, the RMR can have all household calls ring in the room or just the ones for the user as determined by CID. The household calls and "personal" calls can be differentiated by different ringing sounds.

The RMR module can be able to communicate with the MMD, preferably when the MMD is still on-hook. If the MMD were to go off-hook, it can use DTMF tones to signal the RMR to ring, although the caller can hear these tones. Most of the "intelligence" can be in the MMD, which can control the ringing and other audio output of the RMR. The RMR can be cheaper than that the MMD because it can not need to connect to the server directly, store phone numbers, nor manipulate a database.

The RMR can store its own audio messages to be used as ring tones. Alternatively, an open line can be established between the RMR and MMD, the RMR put into speakerphone mode, thus allowing the audio for the ring to be supplied by the MMD. (Describe this internal off-hook circuit works.)

Practical Example

In practice, the RMR works as follows: a call might come in from a friend of a teenager living in the house. Having been listed in that teenager's contact list, the MMD unit can examine the CallerID and seeing that it is for the teenager living in the house, can signal the RMR unit in the teenager's room to ring—but the speaker on the MMD can not ring. The teenager can then pick up the call with a minimum of inconvenience to other household members as the call was channeled to the RMR without ringing any other extension. As with any normal call, anybody can pick up any extension in the house and join in on the call—the MMD/RMR system is merely controlling what calls ring where in the house.

Caller Intercom

Figure 11:
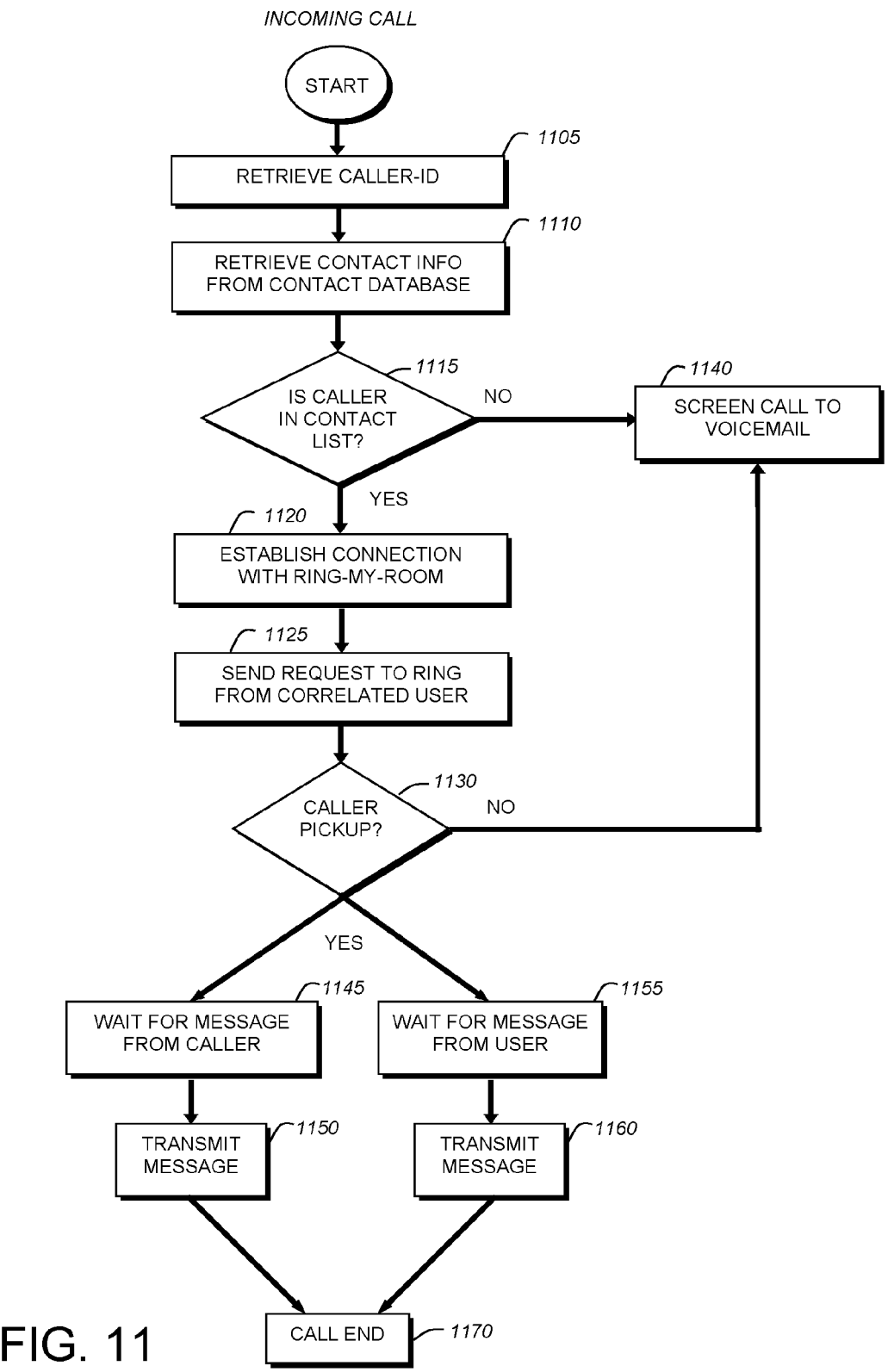
FIG. 11 is a flow diagram of a caller intercom feature of the virtual phone line system for managing messages according to the illustrative embodiment of FIG. 9.

An innovative feature that can be offered for the RMR is a modified version of Push-to-Talk, the popular intercom-like features available on most Nextel® brand phones. The RMR-Push-to-Talk feature works according to the procedure 1100 shown in FIG. 11. The procedure 1100 begins at step 1105 by retrieving CID and then retrieving contact info from the contact database at step 1110 to screen the incoming call. If the caller is in the contact list, the speaker on the RMR becomes active for this feature. The RMR connection is established at step 1120, then the ring for the correlated user is sent to the user at step 1125. Then, if the caller picks up, the system waits for the message from the caller at step 1145, then transmits the completed message at step 1150. Optionally, the caller can have to instigate the speaker going live by hitting a button, or alternatively, the system can indicate with an audio signal or verbal queue to the caller that the Push-to-Talk feature had been instigated. The Push-to-Talk feature can be programmed to only be functional for certain callers and for certain times.

If the RMR user did not come to the phone, the caller can request to leave a voicemail (in any of the means described above) by issuing a command via the keypad or via voice.

If the RMR also includes a microphone, a speakerphone conversation can be carried on.

Home Office Virtual Phone System

Configuration

To set up a Home Office Virtual Phone (HOVP) system, a user obtains an accessory phone number (APN), which presumably can be the phone number for the home business. (Other services offering ancillary phone numbers include Google Voice.) The APN is always be routed through a virtual phone number server and forwarded to the existing household landline. In the house, the enhanced MMD hardware device, the HOVP, is plugged into an RJ-11 jack that is in-line with the home office phone extension. That is, the home office phone now plug into the HOVP. Optionally, the HOVP has a simple visual interface with a display and plurality of buttons, or other appropriate mechanisms for interfacing with the device.

The HOVP is capable of detecting when a call is forwarded from the server by looking for the APN's CID which can be provided b the server through which the APN was routed. The HOVP can be able to sound a distinct ring when this CID was recognized allowing the user to know that a business call was coming into the home phone system. Such a business call can then be picked up from any room in the house with the appropriate greeting given. In this manner, the HOVP system behaves in a similar manner to the services offered by telcos where more than one number is routed to a household. In that case, however, the CID is that of the person placing the call, not the server.

Double-Dialing

A key facet of the HOVP, in addition to have each incoming call routed through a server, can be its ability to transparently connect to a server for each outgoing call, as well. To accomplish this transparent connection, the HOVP can be programmed to immediately dial the server as soon as the user went off-hook with the extension connected to the HOVP. The user can be unaware of this "pre-dial" and can continue to key in the number to be dialed as always, and can hear an ordinary dial tone (optionally generated by the HOVP) while doing so. The server can also generate other sounds such as a phone ringing to simulate a normal phone call. The number thus dialed by the user can be captured and cached by the device and relayed to the server in the form of data as soon as the line was connected. The server can then immediately dial this number to put the desired call through. There can be a subtle delay due to Double-Dialing, but otherwise the experience can feel like placing a normal phone call.

Other phone extensions in the house, not directly connected to the HOVP, can also instigate a double-dial to the server by hitting a code on the touchtone keypad before dialing. For instance, hitting the # sign can signal the HOVP to start dialing the server. Such a function can require the HOVP to use line detection circuitry (already necessary for the MMD functionality) to sense when another extension has gone off-hook and then listen for the code being input on that extension.

Spoofing CallerID

The purpose of Double-Dialing by the HOVP is that users can naturally want outgoing calls to have their APN as their CallerID—not the normal house line. By the same token, business users can need to see the CallerIDs of the parties calling them—not the CallerID of the accessory line.

To solve the outgoing CallerID problem the server, when dialing the number to be reached after such number was relayed to it by the HOVP, can then "spoof" the CallerID. That is, using techniques well known in the industry, the server can insert the APN number as the CallerID for the call going from the server.

Obtaining Caller ID for Incoming Calls

The problem of getting the correct CallerID from the calling party can be handled in a similar manner. As discussed above, as the server forwarded the call that came in to the APN, it can spoof the CallerID to be that of the calling party and not that of the server service. While this allows the HOVP to see that the call is a business call, it does not supply the number of the calling party. To solve this problem the server can communicate the CID to the HOVP in the form of data that can then be displayed on the visual display of the HOVP if it had one. Alternatively, the information can be communicated in audio form to the user of the HOVP before the server put through the call. And finally, the information can be passed to the user via an alternative communication channel such as the Internet where the CID can be displayed on a web page designed for that purpose.

Server Functions

The HOP's ability to immediately connect with the server can also allow a simple handset to offer voice recognition services. For instance, HOVP can offer convenient voice dialing of numbers as users can dial a number by speaking the party's name in the handset. While voice dialing has been offered for many years for use with cellphones, its use in landline systems is limited. This is due to the fact that landline systems (when not part of a larger computer system or PBX system) did not have the connectivity to access contact lists nor the intelligence to perform voice recognition. In addition, the inconvenience of dialing a server for each call prevented the function from being accessed remotely. These impediments are all addressed with the automatic server-connection feature of the HOVP system.

Audio Email

The idea of sending an audio file via email has been around for a long time without catching on. One impediment to "audio email" has been a reluctance or inability to use a microphone connected to a PC, plus the lack of integration of the function into common desktop programs. HOVP owners, however, can be easily able to send audio email using their landlines.

HOVP's Audio Email can work by merely dialing a phone number on their handset preceded by a code (which can also be input quickly after dialing). The code can indicate to the server to record the audio from the handset but not to connect the call. An email address of the party being called (which had earlier been extracted from the user's Outlook or other contact database) can be used to route the Audio Email. The email can be sent with the audio attached as an audio file. Speech-to-text conversion software can also be used to allow text to accompany or replace the audio in the email and optionally, an SMS alert can be sent to the recipient.

The server can use the HOVP's display, if available, to show confirming information, for instance that an Audio Email was sent and to whom. Alternatively, this information can be sent to the user via email, IM, SMS, or a similar means.

Alternatively, instead of sending the audio message via email, the server can deposit the audio message directly into a user's voicemail. Such direct-to-voicemail capabilities are offered by several companies, including www.Slydial.com. Mobile operators also offer users the option to send a message directly to voicemail. The HOVP can be the first system to offer such capabilities via a landline.

The foregoing has been a detailed description of illustrative embodiments of the invention. Various modifications and additions can be made without departing from the spirit and scope of this invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. For example, the terms household and consumers have been used herein to describe the illustrative embodiments, however are readily applicable to all businesses and other entities or users where the functionality of the MMD unit is desired. Also, the flow diagrams are only meant to show an exemplary embodiment of the present invention and are not meant to be the sole procedures of the MMD system and device and related implementations disclosed herein. Accordingly, this description is meant to be taken only by way of example, and not to otherwise limit the scope of this invention.

What is claimed is:

1. A method for managing messages comprising the steps of:
   providing a message managing device operatively connected to a phone line at a first location, the first location having a first recording mechanism, and the message managing device including a second recording mechanism to supplement the first recording mechanism;
   detecting a recording of a first copy of a message at the first recording mechanism at the first location, the message intended to be communicated to a particular user, wherein the detecting is performed by ring detection circuitry of the second recording mechanism that monitors the phone line and detects the recording of the message at the first recording mechanism;

recording a second copy of the message at the first location by the second recording mechanism; and transmitting the second copy of the message to a second location, such that the message at the first location is available to the particular user at both the first location and the second location.

2. The method according to claim 1 wherein the second copy of the message is transmitted to the second location via a text message to the user.

3. The method according to claim 1 further comprising obtaining caller identification information and transmitting the caller identification information with the second copy of the message to the second location.

4. The method according to claim 1 wherein the particular user for which the message is intended to be communicated is determined by the message managing device based upon a contact list for the particular user that is stored in the message managing device.

5. The method according to claim 1 further comprising the step of:

prompting a caller to the phone line for the particular user that the caller intends to receive the message, such that the message can appropriately be forwarded to that particular user.

6. The method according to claim 1 further comprising the step of erasing the second copy of the message when the ring detection circuitry determines that the phone line has been answered by the user.

7. A system for managing messages comprising:

a message managing device that is operatively connected to a phone line at a first location to detect an incoming call and a recording of a first copy of a message at a first recording mechanism at the first location, and the message managing device including a second recording mechanism that supplements the first recording mechanism and records a second copy of the message by the second recording mechanism at the first location; and a message managing server that receives the second copy of the message and transmits it to a second location, distant from the first location, such that the message at the first location is available at both the first location and the second location;

wherein the message managing device detects the recording of the first copy of the message at the first location by ring detection circuitry that monitors the phone line and detects the recording of the first copy of the message at the first recording mechanism.

8. The system according to claim 7 wherein a recipient of the second copy of the message is determined based upon a contact list stored on the message managing device.

9. The system according to claim 7 wherein the message managing device includes ring detection circuitry to detect the incoming call.

* * * * *